A. SWASEY.
TELESCOPE.
APPLICATION FILED JUNE 21, 1907.

959,179.

Patented May 24, 1910.
2 SHEETS—SHEET 1.

Witnesses;
L. C. Badeau.
H. D. Penny.

Inventor:
Ambrose Swasey.
By his Attorney,
F. H. Richards.

A. SWASEY.
TELESCOPE.
APPLICATION FILED JUNE 21, 1907.
959,179.
Patented May 24, 1910.
2 SHEETS—SHEET 2.
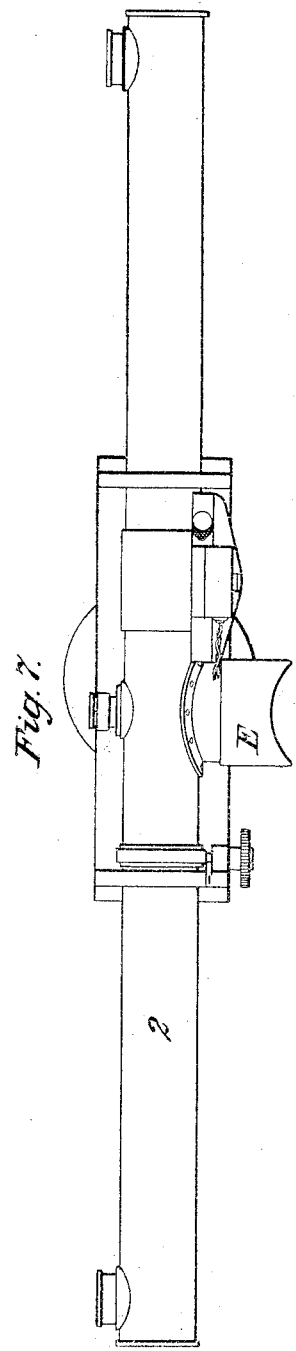
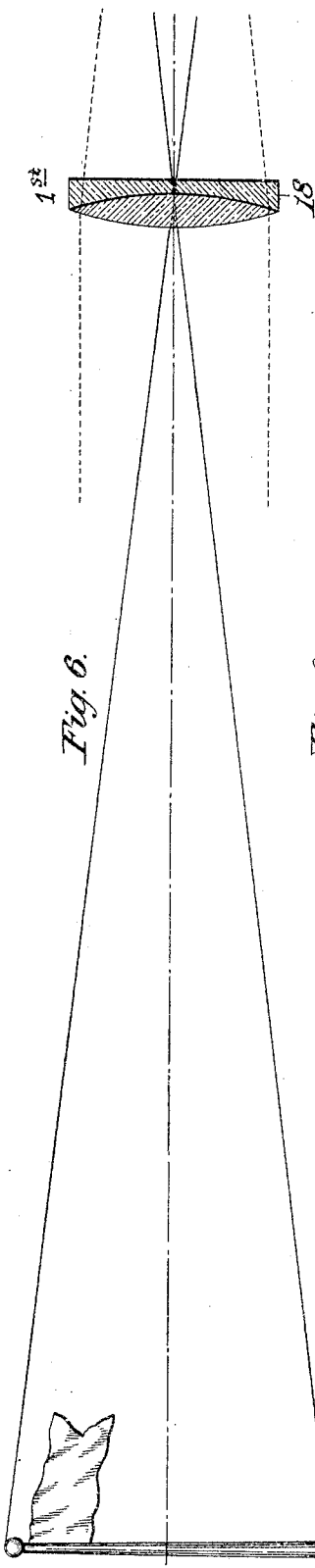
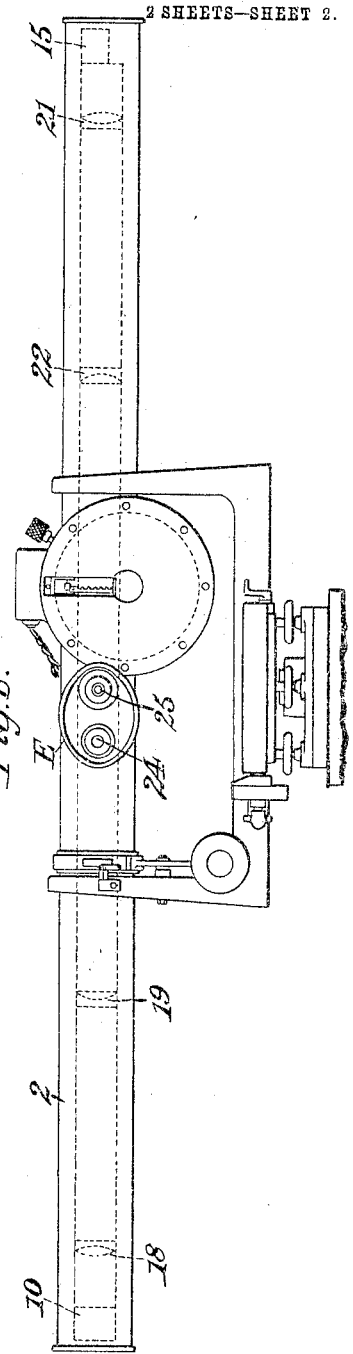
Witnesses;
J. L. Edwards.
H. D. Penney
Inventor:
Ambrose Swasey.
By his Attorney,
F. W. Richards.

UNITED STATES PATENT OFFICE.

AMBROSE SWASEY, OF CLEVELAND, OHIO, ASSIGNOR TO THE WARNER & SWASEY CO., OF CLEVELAND, OHIO, A CORPORATION OF OHIO.

TELESCOPE.

959,179.  Specification of Letters Patent.  Patented May 24, 1910.

Application filed June 21, 1907. Serial No. 380,031.

*To all whom it may concern:*

Be it known that I, AMBROSE SWASEY, a citizen of the United States, residing in Cleveland, in the county of Cuyahoga and State of Ohio, have invented certain new and useful Improvements in Telescopes, of which the following is a specification.

This invention relates to the optical arrangement for telescopes, and is especially designed for use in range finders that are used to determine the distance removed of an object by the process of triangulation.

The object of the invention is to provide a system of lenses that will provide an enlarged field of view with the use of a long tube, as is necessary in instruments of this class.

Figure 4:
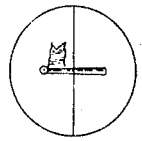
Figure 3:
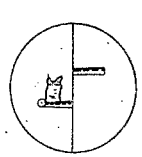
Figure 2:
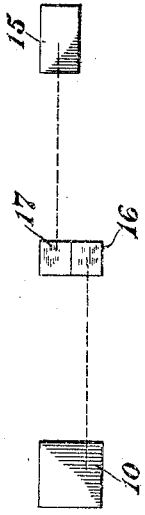
Figure 5:
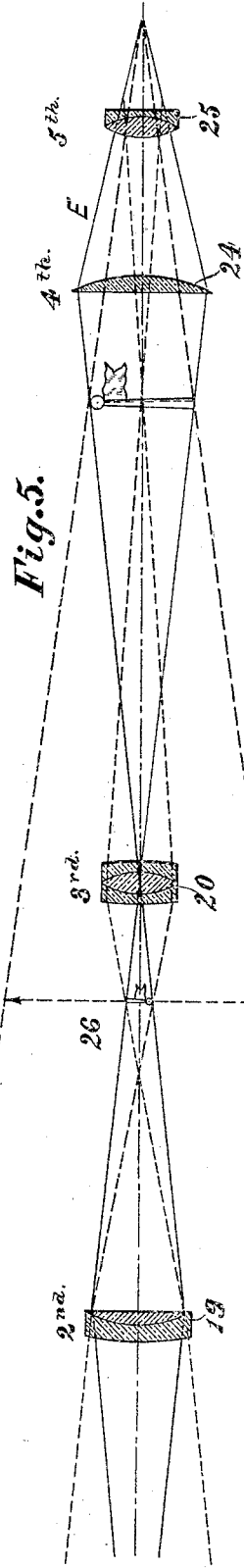
Figure 1:
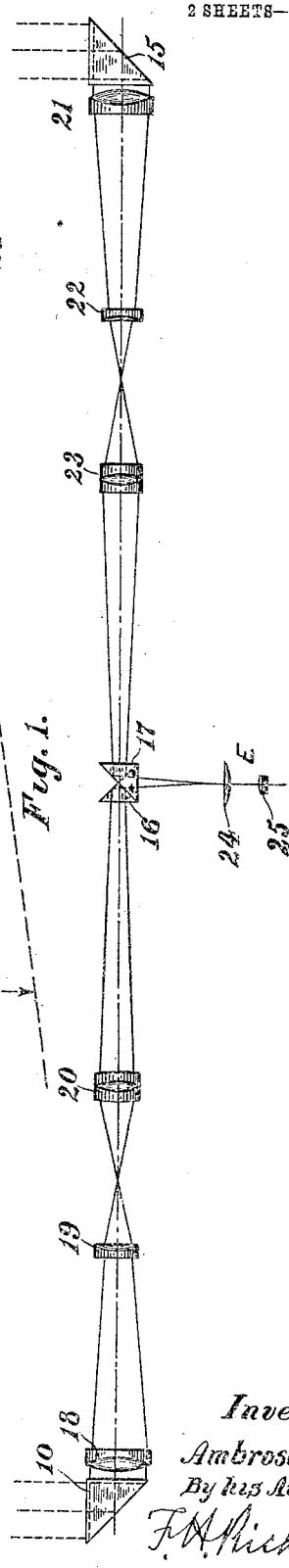

In the accompanying drawing representing embodiments of my invention, Figure 1 is a plan view showing the arrangement of the optical system. Fig. 2 is a diagram showing in front elevation, the arrangement of the reflecting prisms. Figs. 3 and 4 showing the way the image appears in the eye-piece, in the operation of causing alinement of the two images of the object. Figs. 5 and 6 show together as a continuation of the same view, an arrangement of the optical system with the ocular swung around into alinement with the other lenses at one side of the middle reflecting prisms. Fig. 7 is a plan view, and Fig. 8 is a front elevation of the complete instrument.

It is well known in the science of optics that the longer the focal length of a telescope, the smaller the field of view. In instruments of the present type, it is desirable to have the lenses as far removed as possible to give a maximum length of base for determining the range by the process of triangulation. The present arrangement of the lenses therefore is designed to produce as large a field of view as can be obtained with the use of a long tube. The desired results are obtained by using in connection with the objective, a system similar to a compound microscope for magnifying the image produced by the objective, and also interposing at the normal position of such image that would be produced by the objective, a condensing lens. The objective alone would produce an image beyond the position where it could be received by the microscope system; but the rays tending to form this image are intercepted by the condensing lens which will cause the image to be formed nearer the objective. The image will have the same relatively enlarged field, but the image will be reduced in size by being focused nearer the objective. Such reduced image of enlarged field has its light rays received by the triple combination of the microscope system that will enlarge the image and at the same time invert it, and therefore erect the image rays. This erected magnified image of enlarged field, will have its rays received by the eye-piece combination which will still further magnify and project the rays into the eye of the observer.

The instrument is shown as comprising a tubular member 2 in which are supported the optical elements together with their supporting and operating mechanism. At one end of the instrument, the member 2 carries a deflecting member shown in the form of a right angled prism 10. A right angle prism 15 is carried in the tube and these prisms 10 and 15 are practically in alinement at the axis of the tube, although a portion of the prism 15 is removed, since in these instruments the image of the objects is divided into complemental portions which are respectively projected toward the intermediate reflectors by the prisms, that form the image in the ocular. At the central portion of the instrument are arranged a pair of reflecting members, in the form shown as right angle prisms 16, and 17, being vertically superposed to receive the respective complemental portions of the images from the prisms 10 and 15, and project these portions of the image into the ocular, represented generally by E. The prism 10 may be stationary in the inner tube; while the prism 15 may be made movable in order to sight it on the object that is sighted in the prism 10. Suitable lenses are interposed between the prisms 10 and 16 and the prisms 15, 17, to properly refract the rays. An objective lens 18 is mounted in the inner tube adjacent the prism 10 and between this lens and the prism or reflector 16 are mounted two lenses 19 and 20 carried in the tube. An objective 21 is mounted in the inner tube adjacent the prism 15 in the tube, and between this objective and the prism 17 are mounted two lenses 22 and 23. The ocular is shown as composed of two plano-convex lenses 24 and 25 mounted in the tube. These lenses are shown as "positive" eye-piece lenses.

In Fig. 1 of the drawing, the rays of light from the object are shown as received by the prisms 10 and 15 and reflected along the optical axis toward each other. These rays are received respectively by the prisms 16 and 17 in two portions, the upper portion by one of the prisms and the lower portion by the other, as indicated in Fig. 2. Therefore the rays from the prism 10 received by the prism 16, comprising the lower half of the image, are projected into the eye-piece lenses 24 and 25; while the rays from the upper half of the image reflected by prism 17 are projected into the eye-piece, and these prisms are so arranged that both images will be received by the eye-piece, and by properly adjusting the prisms 10 and 15 these two halves of the image will aline to form a complete image, as indicated in Figs. 3 and 4.

In the optical system shown in Fig. 1 there are two identical arrangements on each side of the prisms 16 and 17, each of which coöperate with the eye-piece in the same manner. Figs. 5 and 6 represent in complemental views one of these optical systems of lenses on one side of the middle prisms, with the eye-piece member turned around through a right angle to be in alinement with the other lenses, with the prism 16 left off and these lenses are at the same distance removed from the other lenses. Therefore, these figures will represent the relative positions of these lenses. The objective 18 and condensing lens 19 form an image that is received by the microscope system which has a triple combination double convex lens 20 and the eye-piece member E, that is shown composed of two lenses 24 and 25. The objective 18 would not form an image in the proper position to be received by the microscope system, therefore the condenser 19 is introduced to give a greater field of view for a given length of instrument. By the laws of optics, this image is inverted, and is considerably reduced. This inverted image is received by the microscope system which erects it and at the same time magnifies it, and thereupon the eye-piece member further magnifies this magnified real erected image and produces a greatly magnified virtual image that is perceived by the eye but in its normal erected position.

The five lenses that intercept the rays between the observer and the reflector, are indicated in the drawing as first, second, third, fourth and fifth and are similarly referred to in some of the claims.

Having thus described my invention, I claim:

1. In a device of the character described, the combination of a tubular support having a reflector at each end to receive rays from a distant object and reflect these rays toward the intermediate portion of the support, an objective lens located adjacent each of said reflectors, an eye-piece member extending transversely from the intermediate part of the support, a pair of reflecting members in position to receive complemental portions respectively of the image rays projected by said end reflectors and objectives to project these rays into the eye piece member, a lens arranged between each objective and the image that would be formed thereby, and a double convex lens arranged to receive the image rays from each said latter lens producing an inverted magnified image of the object, the eye-piece member being arranged to receive both the image rays produced by the last mentioned lens to produce a magnified image thereof.

2. In a device of the character described, the combination of a tubular support having a reflector at each end to receive rays from a distant object and reflect these rays toward the intermediate portion of the support, an objective lens located adjacent each of said reflectors, an eye-piece member extending transversely from the intermediate part of the support, a pair of reflecting members in position to receive complemental portions respectively of the image rays projected by said end reflectors and objectives to project such rays into the eye-piece member, a lens arranged between each objective lens and the image that would be thereby projected to produce a magnified image of enlarged field, and a double convex lens arranged to receive the image rays from each said latter lens producing an inverted and magnified image, the eye-piece member being arranged to receive the image rays produced by the last mentioned lens to produce a magnified image thereof, each said third lens together with the eye-piece lens system constituting a compound microscope system to magnify the image rays projected from the said second lens adjacent the objectives.

3. In a device of the character described, the combination of a tubular support, having a reflector at one end to receive light rays from a distant object and reflect them through the support, an objective lens located adjacent said reflector, a microscope lens system comprising an objective and eye-piece carried by the support, the said end objective being of a focal length to produce an image of the object beyond the position to be received by the objective of said microscope system, and a condensing lens intercepting the rays projected by the said end objective to condense the image rays and form an image of the object between the microscope objective and the condensing lens in position to be received by the objective of the microscope system and thereby magnified and erected to be observed by the eye-piece of the microscope.

4. In a device of the character described, the combination of a tubular support, having a reflector at one end to receive light rays from a distant object and reflect them through the support, an objective lens located adjacent said reflector, a microscope lens system consisting of an objective lens and a two lens positive eye-piece carried by the support, the said end objective being of a focal length to produce an image of the object beyond the position to be received by the objective of said microscope system, and a condensing lens intercepting the rays projected by the said end objective to condense the image rays and form an image of the object between the microscope objective and the condensing lens in position to be received by the objective of the microscope system and thereby magnified and erected to be observed by the eye-piece of the microscope.

5. In a device of the character described, the combination of a tubular support having a reflector at each end to receive light rays from a distant object and reflect them toward the intermediate portion of the support, an objective lens located adjacent each of said reflectors, an eye-piece member extending transversely from the intermediate part of the support, a pair of reflectors in the support, one in alinement with each of said objectives and organized to reflect complemental portions of image rays from the end objectives into the same eye-piece member, two lenses in the tubular support, one between each said intermediate reflector and its corresponding objective, each of said latter lenses forming with their common eye-piece member a compound microscope system of which the said two lenses constitute the objective for the eye-piece member, said outer objectives being each of a focal length to form an image beyond the said microscope objectives, and a condensing lens arranged between each said outer objective and the microscope objective and organized to intercept the image rays projected by the outer objective and condense them to form an image between itself and the corresponding microscope objective in position to be received by the latter and thereby magnified and erected to be observed by the eye-piece member.

6. In a device of the character described, the combination of a tubular support having a reflector at each end to receive light rays from a distant object and reflect them toward the intermediate portion of the support, an objective lens located adjacent each of said reflectors, a two lens positive eye-piece member extending transversely from the intermediate part of the support, a pair of reflectors in the support one in alinement with each of said objectives and organized to reflect complemental portions of image rays from the end objectives into the same eye-piece member, two lenses in the tubular support, one between each said intermediate reflector and its corresponding objective, each of said latter lenses forming with their common eye-piece member a compound microscope system of which the said two lenses constitute the objective for the eye-piece member, said outer objectives being each of a focal length to form an image beyond the said microscope objectives, and a condensing lens arranged between each of said outer objectives and the microscope objective and organized to intercept the image rays projected by the outer objective and condense them to form an image between itself and the corresponding microscope objective in position to be received by the latter and thereby magnified and erected to be observed by the eye-piece member.

7. In a device of the character described, the combination of a tubular support having a reflector at each end to receive rays from a distant object and reflect these rays toward the intermediate portion of the support, an objective lens located adjacent each of said reflectors, a positive eye-piece member extending transversely from the intermediate part of the support, a pair of reflecting members in position to receive complemental portions respectively of the image rays projected by said end reflectors and objectives to project these rays into the positive eye piece member, a second lens arranged between each objective and the image that would be formed thereby, and a third lens arranged to receive the image rays from each said second lens producing an inverted magnified image of the object, the eye-piece member being arranged to receive the image rays produced by the last mentioned lens to produce a magnified image thereof.

8. In a device of the character described, the combination of a tubular support having a reflector at each end to receive rays from a distant object and reflect these rays toward the intermediate portion of the support, an objective lens located adjacent each of said reflectors, an eye-piece member extending transversely from the intermediate part of the support, a pair of reflecting members in position to receive complemental portions respectively of the image rays projected by said end reflectors and objectives to project such rays into the eye-piece member, a second lens arranged between each objective lens of the two halves and the image that would be thereby projected to produce a magnified field of enlarged view, and a third lens arranged to receive the image rays from each of said second lenses producing an inverted and magnified image, the positive eye-piece member being arranged to receive the image rays produced by the last mentioned lenses to produce a magnified image thereof, each said third lenses together with the positive eye-piece lenses constituting a compound microscope system to magnify the image rays projected from the said second lenses adjacent the objectives.

9. In a telescope, the combination of an objective lens, a condensing lens arranged between the objective and the place where an image would be formed thereby to produce an inverted image at a less distance removed from the objective, and a compound microscope system of lenses comprising an objective member arranged to receive said inverted image and produce a magnified and erected image, and a positive eye-piece member by which the latter image is projected into the eye of the observer under great magnification.

AMBROSE SWASEY.

Witnesses:
L. B. STAUFFER,
F. H. RICE.